(12) United States Patent
Kim

(10) Patent No.: US 9,830,949 B2
(45) Date of Patent: Nov. 28, 2017

(54) METHOD AND SYSTEM FOR PROVIDING 4D CONTENT PRODUCTION SERVICE AND CONTENT PRODUCTION APPARATUS THEREFOR

(71) Applicant: CJ 4DPLEX CO., LTD., Seoul (KR)

(72) Inventor: Ju Whan Kim, Goyang-si (KR)

(73) Assignee: CJ 4DPLEX CO., LTD., Seoul (KR)

( * ) Notice: Subject to any disclaimer, the term of this patent is extended or adjusted under 35 U.S.C. 154(b) by 0 days.

(21) Appl. No.: 14/891,639

(22) PCT Filed: May 8, 2014

(86) PCT No.: PCT/KR2014/004111
§ 371 (c)(1),
(2) Date: Nov. 16, 2015

(87) PCT Pub. No.: WO2014/185658
PCT Pub. Date: Nov. 20, 2014

(65) Prior Publication Data
US 2016/0086637 A1    Mar. 24, 2016

(30) Foreign Application Priority Data
May 15, 2013 (KR) .................. 10-2013-0054829

(51) Int. Cl.
*G11B 27/11* (2006.01)
*G06Q 30/02* (2012.01)
(Continued)

(52) U.S. Cl.
CPC .......... *G11B 27/11* (2013.01); *G06Q 30/0276* (2013.01); *H04N 5/262* (2013.01); *H04N 9/8715* (2013.01)

(58) Field of Classification Search
CPC ........... G07F 17/32; A63J 25/00; A63J 5/025; H04N 21/25891
See application file for complete search history.

(56) References Cited

U.S. PATENT DOCUMENTS 8,245,124 B1 * 8/2012 Gupta .................. G11B 27/034
715/202
2003/0145323 A1  7/2003 Hendricks et al.
(Continued)

FOREIGN PATENT DOCUMENTS

KR   1020060007845 A    1/2006
KR    100863280 B1    10/2008
(Continued)

OTHER PUBLICATIONS

International Search Report for PCT/KR2014/004111 dated Aug. 12, 2014.
(Continued)

*Primary Examiner* — Hung Dang
*Assistant Examiner* — Sunghyoun Park
(74) *Attorney, Agent, or Firm* — Hauptman Ham, LLP

(57) ABSTRACT

The present invention relates to a method and system for providing a 4D content production service and a content production apparatus therefor. The system for providing a 4D content production service includes: a terminal device configured to transmit content source including at least one of a picture, text and video, synopsis information and video time information and video time information, to receive content and special effect codes, to select a special effect code corresponding to each play interval of the content and to transmit special effect selection information indicating selected special effect codes; and a content production apparatus configured to produce content using the content source on the basis of the synopsis information and video time information received from the terminal device, to transmit the produced content and special effect codes to the terminal device, to receive the special effect selection information from the terminal device and to generate 4D content using the special effect selection information. According to
(Continued)

the present invention, a business proprietor can promote business expansion and improve the image of business and a user can produce 4D content by directly participating in content selection and production.

9 Claims, 2 Drawing Sheets

(51) Int. Cl.
*H04N 5/262* (2006.01)
*H04N 9/87* (2006.01)

(56) References Cited

U.S. PATENT DOCUMENTS

| | | | |
|---|---|---|---|
| 2004/0015983 A1* | 1/2004 | Lemmons | H04N 5/44 725/12 |
| 2007/0016866 A1* | 1/2007 | Sporer | G03B 31/04 715/723 |
| 2008/0050093 A1* | 2/2008 | Koga | G11B 27/322 386/239 |
| 2008/0115062 A1* | 5/2008 | Ngan | G06F 3/0482 715/723 |
| 2010/0153520 A1 | 6/2010 | Daun et al. | |
| 2010/0183278 A1* | 7/2010 | Black | G11B 27/034 386/278 |
| 2010/0267370 A1* | 10/2010 | Lee | H04N 5/445 455/414.1 |
| 2011/0283296 A1* | 11/2011 | Chun | H04M 1/72522 719/318 |
| 2012/0117472 A1* | 5/2012 | Su | G11B 27/034 715/719 |
| 2012/0127268 A1 | 5/2012 | Yun et al. | |
| 2013/0272679 A1* | 10/2013 | Cavalcanti | H04N 9/87 386/282 |
| 2013/0322856 A1* | 12/2013 | Oh | H04N 9/79 386/280 |

FOREIGN PATENT DOCUMENTS

| | | |
|---|---|---|
| KR | 1020110022232 A | 3/2011 |
| KR | 101075122 B1 | 10/2011 |
| KR | 1020120105788 A | 9/2012 |
| RU | 105102 U1 | 5/2011 |

OTHER PUBLICATIONS

Extended European Search Report dated Oct. 4, 2016 for 14797445.5.
Wikipedia: "Amazon Web Services", Internet Article, May 13, 2013, XP055303048, Retrieved from the Internet : https://en.wikipedia.org/w/index.php?title=Amazon_Web_Services&oldid=554882064.
Saikat Basu: "5 Free Tools for Online Video Editing", Internet Article, Aug. 6, 2012, XP055303039, Retrieved from the Internet : http://www.makeuseof.com/tag/5-free-tools-online-video-editing/.
Rafael Silva Pereira et al. : "Video Processing in the Cloud", Jan. 1, 2012, Springer International Publishing, Cham, XP05503209, ISSN: 2191-5768, ISBN: 978-3-319-07386-6, pp. 1-10.
Kenichi Ota et al. : "Media Cloud Service with Optimized Video Processing and Platform", Fujitsu Scientific & Technical Journal, vol. 47, No. 4, Oct. 31, 2011, pp. 395-400, XP055302918, Retrieved from the Internet http://www.fujitsu.com/global/documents/about/resources/publications/fstj/archives/vol47-4/paper04.pdf.
Alon Cohen et al. : "EE Times—4D The New Cool Thing for Your Home Theater", Internet Article, Nov. 30, 2005, XP055303450, Retrieved from the Internet : http://www.eetimes.com/document.asp?doc_id=1274750.
Yeongmi Kim et al. : "A tactile glove design and authoring system for immersive multimedia", IEEE Multimedia, IEEE Service Center, New York, NY, US, vol. 17, No. 3, Jul. 1 2010, pp. 34-45, XP011342517, ISSN: 1070-986X, DOI 10.1109/MMUL.2010.5692181.
Wikipedia: "4D film", Internet Article, May 12, 2013, XP055303051, Retrieved from the Internet: https://en.wikipedia.org/w/index.php?title=4D_film&oldid=554730702.
Austin Carr: "YouTube Pairs With Google TV for Second-Screen Experience. Could iOS Be Next?", Internet Article, Nov. 13, 2012, XP055261656, Retrieved from the Internet: https://www.fastcompany.com/3002924/youtube-pairs-google-tv-second-screen-experience-could-ios-be-next.
Russian Search Report dated Mar. 30, 2017 corresponding to Russian Patent Application No. RU 2015153397.

* cited by examiner

[Fig. 1]
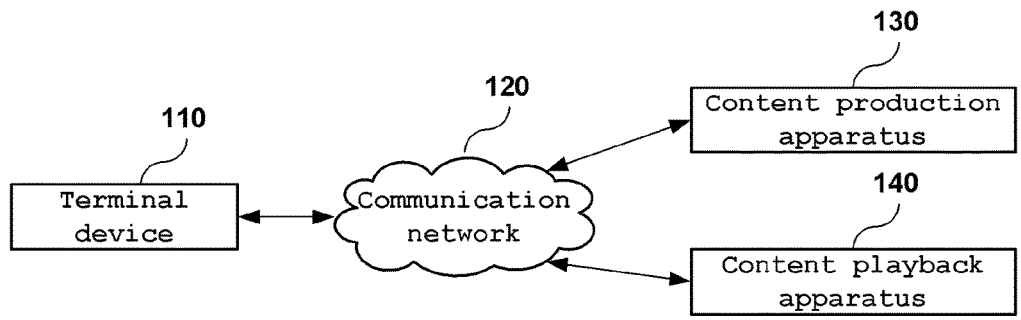
[Fig. 2]
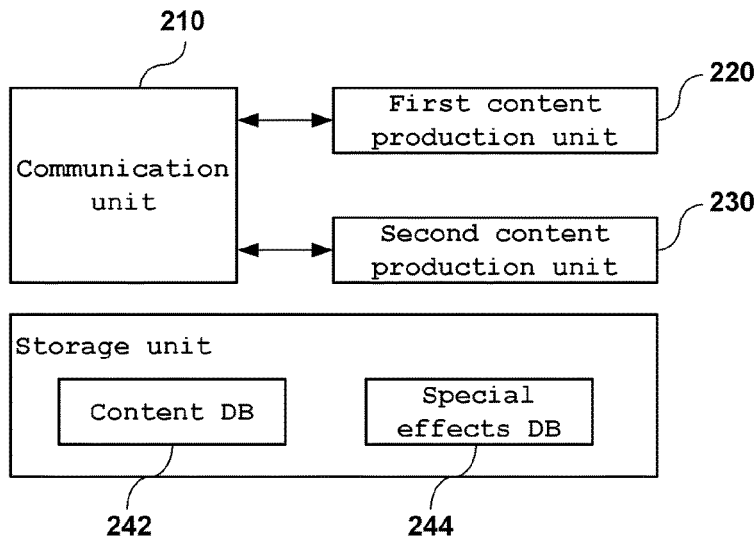
[Fig. 3]
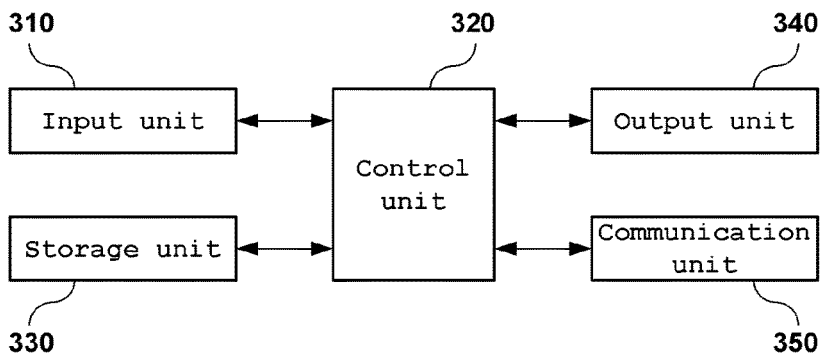

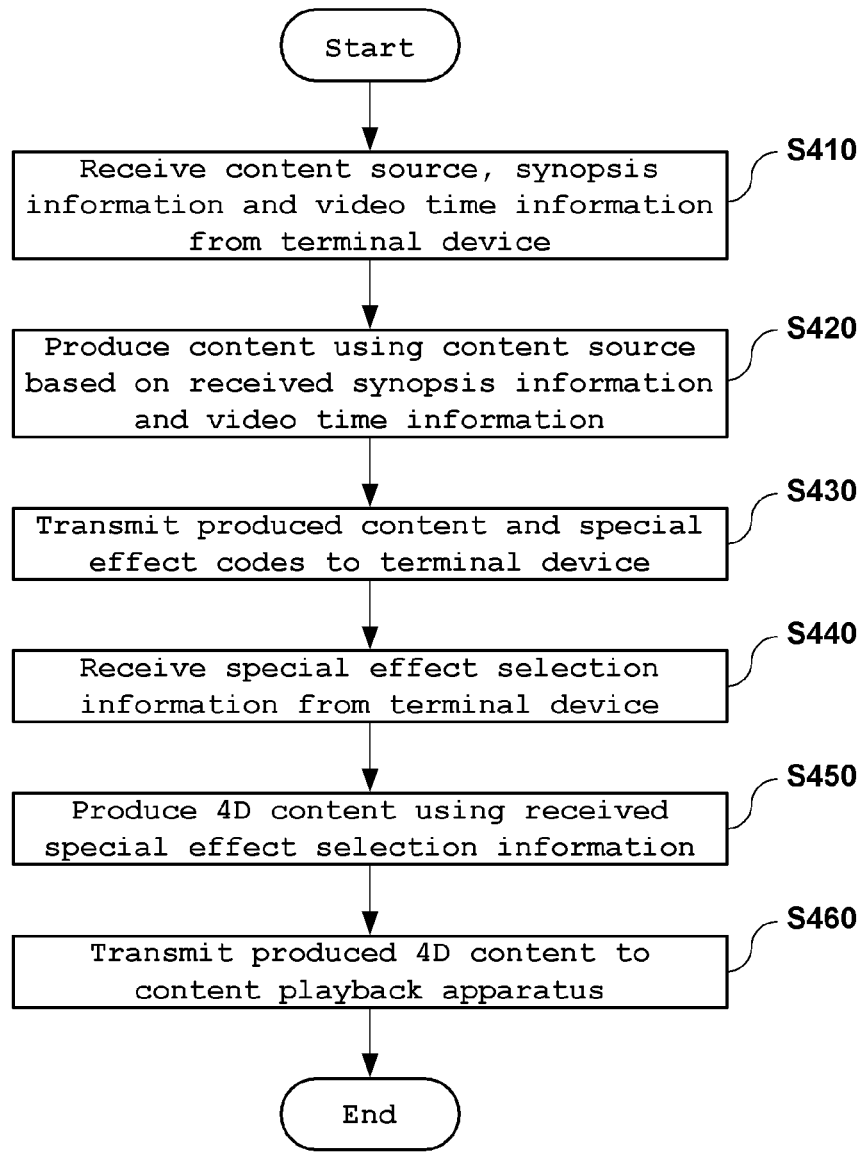

METHOD AND SYSTEM FOR PROVIDING 4D CONTENT PRODUCTION SERVICE AND CONTENT PRODUCTION APPARATUS THEREFOR

TECHNICAL FIELD

The present invention relates to a method and system for providing a 4D content production service and a content production apparatus therefor.

BACKGROUND ART

Recently, stereoscopic photography equipment has been used to film movies to enable simultaneous release of a 3D film with augmented reality and a 2D film, which have the same content. In addition, 3D movie theaters for showing 3D movies have opened. Furthermore, there is a theater adopting a 4D chair which is equipped with a vibration device to vibrate according to automatic control in connection with middle and low-pitched sound of a movie, thereby providing vivid audio experience to audiences. Moreover, to provide more realism to audiences, there was provided a method of embedding various special effect signals in video signals of a movie such that special effects are generated according to the video signals to stimulate the sense of smell of audiences, thereby providing an environment where the audiences can be immersed in the movie.

As described above, the conventional 4D industry is limited to general theaters or 4D rider. Accordingly, 4D content is classified into content created for 4D and content produced by applying 4D effects to normal films. If user-specific content is produced, then the number of cases of 4D selection may increase and a user may have 4D effect with uniqueness through production of user-specific content (including CF) rather than normal content.

SUMMARY OF INVENTION

Technical Problem

Accordingly, the present invention has been made in view of the above-mentioned problems occurring in the prior art, and it is an object of the present invention to provide a method and system for providing a 4D content production service and a content production apparatus therefor, by which a user can produce 4D content of their own by directly participating in content selection and production.

Solution to Problem

To accomplish the above objects, according to a first embodiment of the present invention, there is provided a system for providing a 4D content production service, including: a terminal device configured to transmit content source including at least one of a picture, text and video, synopsis information and video time information to a content production apparatus, to receive content and special effect codes, to select a special effect code corresponding to each play interval of the content and to transmit special effect selection information indicating selected special effect codes to the content production apparatus; and a content production apparatus configured to produce content using the content source on the basis of the synopsis information and video time information received from the terminal device, to transmit the produced content and special effect codes to the terminal device, to receive the special effect selection information from the terminal device and to generate 4D content using the special effect selection information.

According to a second embodiment of the present invention, there is provided a content production apparatus, including: a storage unit storing special effect codes; a communication unit for receiving, from a terminal device, content source including at least one of a picture, text and video, synopsis information and video time information, transmitting content and special effect codes stored in the storage unit to the terminal device and receiving, from the terminal device, special effect selection information indicating a selected special effect code corresponding to each play interval of the content; a first content production unit for producing content using the content source on the basis of the synopsis information and the video time information received from the terminal device; and a second content production unit for producing 4D content using the special effect selection information received from the terminal device.

According to a third embodiment of the present invention, there is provided a method for providing a 4D content production service of a content production apparatus, including: receiving content source including at least one of a picture, text and video, synopsis information and video time information from a terminal device; generating content using the content source on the basis of the received synopsis information and video time information; transmitting the generated content and special effect codes to the terminal device; receiving, from the terminal device, special effect selection information indicating a selected special effect code corresponding to each play interval of the content; and producing 4D content using the received special effect selection information.

Advantageous Effects of Invention

According to the present invention, it is possible to provide a method and system for providing a 4D content production service and a content production apparatus therefor, by which a user produces content using images, text, video, etc. and applies 4D codes to the produced content to create 4D content. Accordingly, a business proprietor can promote business expansion and improve the image of business and a user can produce 4D content by directly participating in content selection and production.

BRIEF DESCRIPTION OF DRAWINGS

FIG. 1 illustrates a configuration of a system for providing a 4D content production service according to an embodiment of the present invention.

FIG. 2 is a block diagram of a content production apparatus according to an embodiment of the present invention.

FIG. 3 is a block diagram of a terminal device according to an embodiment of the present invention.

FIG. 4 is a flowchart illustrating a method for providing a 4D content production service according to an embodiment of the present invention.

MODE FOR THE INVENTION

The terminology used herein is for the purpose of describing particular embodiments only and is not intended to be limiting of the invention. Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, singular forms are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The terms "module" and "portion" attached to describe the names of components are used herein to help the understanding of the components and thus they should not be considered as having specific meanings or roles.

In the meantime, although terms including an ordinal number, such as first or second, may be used to describe a variety of constituent elements, the constituent elements are not limited to the terms, and the terms are used only for the purpose of discriminating one constituent element from other constituent elements. For example, a first constituent element could be termed a second constituent element, and similarly, a second constituent element may be termed a first constituent element without departing from the teachings of the present invention.

Reference will now be made in detail to the preferred embodiments of the present invention, examples of which are illustrated in the accompanying drawings. Wherever possible, the same reference numbers will be used throughout the drawings to refer to the same or like parts.

In the following description of the present invention, a detailed description of known functions and configurations incorporated herein will be omitted when it may obscure the subject matter of the present invention. The accompanying drawings illustrate exemplary embodiments of the present invention and provide a more detailed description of the present invention. However, the scope of the present invention should not be limited thereto.

FIG. 1 illustrates a configuration of a system for providing a 4D content production service according to an embodiment of the present invention.

Referring to FIG. 1, the system for providing a 4D content production service according to an embodiment of the present invention includes a terminal device 110, a communication network 120, a content production apparatus 130 and a content playback apparatus 140. Here, the content production apparatus 130 and the content playback apparatus 140 may be implemented as a server.

The terminal device 110 is a device of a user who produces or uses content and may include a PC, notebook computer, mobile phone, tablet PC, navigation system, smartphone, PDA (personal digital assistant), PMP (portable multimedia player) and digital broadcast receiver. These devices are exemplary and the terminal device 110 comprises all communication devices that have been developed and commercialized or will be developed.

The terminal device 110 is connected to the content production apparatus 130 through the communication network 120 to transmit content source, synopsis information and image time information including pictures, text, video, etc. necessary to produce content to the content production apparatus 130 and to receive content and special effect codes generated in the content production apparatus 130 as a response to the transmitted information from the content production apparatus 130. The terminal device 110 selects a special effect code corresponding to each play interval of the content and transmits information on the selected special effect code to the content production apparatus 130. Here, the special effect code refers to a code for generating special effects such as water, wind, chair movement, etc. in synchronization with each play interval of the content.

In addition, the terminal device 110 may be connected to the content playback apparatus 140 through the communication network 120 to play information, such as a date, time and place necessary to play the 4D content, to the content playback apparatus 140.

The communication network 120 which interconnects the terminal device 110, the content production apparatus 130 and the content playback apparatus 140 can be any type of communication network. For example, the communication network 120 can include one or more various types of known networks, such as an IP network providing a large-capacity data transmission/reception service and seamless data service through Internet protocol, an all IP network constructed by integrating different networks based on IP, a WiBro (Wireless Broadband) network, a wireless LAN including a Wi-Fi network, a WPAN, a wired communication network, a mobile communication network, an HSDPA (High Speed Downlink Packet Access) network and a satellite communication network. In addition, the communication network 120 can also include a next-generation communication network.

The content production apparatus 130 receives content source, synopsis information and video time information from the terminal device 110 and generates content using the content source on the basis of the received synopsis information and video time information. The content production apparatus 130 transmits the generated content and special effect codes to the terminal device 110, receives special effect selection information from the terminal device 110 as a response to the content and special effect codes and produces 4D content including special effect codes using the received special effect selection information.

In addition, the content production apparatus 130 transmits the produced 4D content to the content playback apparatus 140. To achieve this, the content production apparatus 130 can convert the produced 4D content into a format in which the 4D content can be played back by the content playback apparatus 140.

The content playback apparatus 140 respectively receives the 4D content and playback information from the content production apparatus 130 and the terminal device 110 and plays back the 4D content based on the play information. Here, the content playback apparatus 140 can produce special effects such as water, wind and chair movement by controlling a chair, a special effect device, etc. according to the special effect codes included in the 4D content.

FIG. 2 is a block diagram of the content production apparatus according to an embodiment of the present invention.

Referring to FIG. 2, the content production apparatus 130 according to an embodiment of the present invention includes a communication unit 210, a first content production unit 220, a second content production unit 230 and a storage unit 240.

The communication unit 210 transmits and receives data through the communication network 120. Specifically, the communication unit 210 communicates with the terminal device 110 to transmit and receive data necessary for content production. That is, the communication unit 210 receives content source, synopsis information and video time information from the terminal device 110, transmits content special effect codes, generated by the first content production unit 220, to the terminal device 110 and receives special effect selection codes from the terminal device 110.

In addition, the communication unit 210 communicates with the content playback apparatus 140 to transmit 4D content produced by the second content production unit 230 to the content playback apparatus 140.

The first content production unit 220 produces content using the content source on the basis of the synopsis information and video time information received from the terminal device 110 through the communication unit 210.

The second content production unit 230 produces 4D content using the special effect selection information received from the terminal device 110 through the communication unit 210.

The storage unit 240 stores data and programs necessary to provide the 4D content production service. Specifically, the storage unit 240 may include a content DB 242 storing content and a special effects DB 244 storing special effect codes.

FIG. 3 is a block diagram of the terminal device according to an embodiment of the present invention.

Referring to FIG. 3, the terminal device 110 according to an embodiment of the present invention includes an input unit 310, a control unit 320, a storage unit 330, an output unit 340 and a communication unit 350.

The input unit 310 generates a user input signal corresponding to a choice or command of a user. The input unit 310 can be implemented as various types of input devices. For example, the input unit 310 can include at least one of a key input means such as a keypad or a keyboard, a touch input means including a touch sensor or a touch pad, a gesture input means including at least one of a gyro sensor, a geomagnetic sensor, an acceleration sensor, a proximity sensor and a camera, and an audio input means. In addition, the input unit 310 can include any type of input means which is under development or will be developed. Accordingly, the user can input a content production service request, content source synopsis information, video time information, play information, etc. through the input unit 310.

The control unit 320 controls the input unit 310 to receive the content source, synopsis information and video time information from the user and controls the communication unit 350 to transmit the received content source, synopsis information and video time information to the content production apparatus 130. The control unit 320 receives input for selecting a special effect code corresponding to each play interval of the content received from the content production apparatus 130 to generate special effect selection information and controls the communication unit 350 to transmit the generated special effect selection information to the content production apparatus 130.

In addition, the control unit 320 can control the input unit 310 to receive playback information from the user and control the communication unit 350 to transmit the received playback information to the content playback apparatus 140.

The storage unit 330 is a storage medium for storing data and programs necessary to execute operations and functions of the terminal device 110. According to an embodiment of the present invention, the storage unit 330 can store content source including pictures, text and video, etc. necessary to produce content. The storage unit 330 includes a memory such as RAM (Read Access Memory) and ROM (Read Only Memory), HDD (Hard Disk Drive), flash memory, and storage such as CD-ROM and DVD.

The output unit 340 displays a user interface screen through which a special effect code corresponding to each play interval of content is selected. In addition, the output unit 340 may be integrated with the input unit 310 to receive content source, synopsis information and video time information from the user under the control of the control unit 320. For example, the output unit 340 may include an LCD (Liquid Crystal Display), TFT-LCD (Thin Film Transistor-Liquid Crystal Display), LED (Light Emitting Diode), OLED (Organic Light Emitting Diode), AMOLED (Active Matrix Organic Light Emitting Diode), flexible display, 3D display, etc. Furthermore, the output unit 340 may include display means which have been developed and commercialized or can be implemented according to technical development.

The communication unit 350 transmits and receives data through the communication network 120. Specifically, the communication unit 350 communicates with the content production apparatus 130 to request the content production apparatus 130 to provide the content production service under the control of the control unit 320 or transmits/receives data for content production to/from the content production apparatus 130. That is, the communication unit 350 transmits content source, synopsis information and video time information to the content production apparatus 130, receives content and special effect codes, generated by the content production apparatus 130, from the content production apparatus 130 and transmits special effect selection information to the content production apparatus 130.

In addition, the communication unit 350 may transmit received playback information to the content playback apparatus 140 under the control of the control unit 350.

FIG. 4 is a flowchart illustrating a method for providing a 4D content production service according to an embodiment of the present invention.

Referring to FIG. 4, the content production apparatus 130 receives content source, synopsis information and video time information from the terminal device 110 (S410).

The content production apparatus 130 produces content using the content source on the basis of the received synopsis and video time information (S420). That is, the content production apparatus 130 determines the sequence of the content source using the synopsis information and determines the duration of the content, that is, running time, based on the video time information.

The content production apparatus 130 transmits the content and special effect codes to the terminal device (S430). Here, the special effect codes are used to create special effects such as water, wind, chair movement, etc. in synchronization with each play interval of the content.

Then, the content production apparatus 130 receives special effect selection information from the terminal device 110 (S440). The special effect selection information refers to information about a special effect code corresponding to each play interval of the content, which is selected by the terminal device 110.

The content production apparatus 130 produces 4D content using the received special effect selection information (S450). Here, the 4D content includes the special effect code corresponding to each play interval.

In addition, the content production apparatus 130 may transmit the produced 4D content to the content playback apparatus 140 (S460). The content playback apparatus 140 receives playback information from the terminal device 110 and plays the 4D content on the basis of the received play information. The content playback apparatus 140 can create special effect such as water, wind, chair movement, etc. by controlling a chair, a special effect device, etc. according to the special effect codes included in the 4D content.

The above-described method may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit data to and receive data from the processor via various known means.

The embodiments of the present invention have been described with reference to the attached drawings. The embodiments illustrated in the figures should not be construed as a limitation of the invention and may be combined by a person skilled in the art, who is well-acquainted with the specification. Some components may be considered to be omitted when the embodiments are combined.

Here, the meaning of specific terms or words used in the specification and claims should not be limited to the literal or commonly employed sense, but should be construed in accordance with the technical spirit disclosed in the specification.

Therefore, it should be understood, however, that there is no intent to limit the invention to the particular forms disclosed, but on the contrary, the invention is to cover all modifications, equivalents, and alternatives falling within the spirit and scope of the invention as defined by the claims.

The invention claimed is:

1. A system for providing a Four-Dimensional (4D) content production service, the system comprising:
    a terminal device configured to
        transmit content source including at least one of a picture, text and video, synopsis information and video time information to a content production apparatus,
        receive content and special effect codes from the content production apparatus,
        select a special effect code corresponding to each play interval of the content, and
        transmit special effect selection information indicating selected special effect codes to the content production apparatus; and
    the content production apparatus configured to
        produce content using the content source on the basis of the synopsis information and video time information received from the terminal device,
        transmit the produced content and the special effect codes to the terminal device,
        receive the special effect selection information from the terminal device, and
        generate 4D content using the special effect selection information,
    wherein the terminal device is configured to transmit playback information including a play date, time and place,
    wherein the playback information is free from synchronization with the content, and
    wherein the special effect codes are used to create special effects in synchronization with each play interval of the content.

2. The system according to claim 1, wherein the system further comprises a content playback apparatus configured to play the 4D content on the basis of the playback information received from the terminal device.

3. The system according to claim 2, wherein the content playback apparatus controls a chair and a special effect device according to special effect codes included in the 4D content to create special effects.

4. A content production apparatus, comprising:
    a storage unit storing special effect codes;
    a communication unit for
        receiving, from a terminal device, content source including at least one of a picture, text and video, synopsis information and video time information,
        transmitting content and special effect codes stored in the storage unit to the terminal device and
        receiving, from the terminal device, special effect selection information indicating a selected special effect code corresponding to each play interval of the content;
    a first content production unit for producing content using the content source on the basis of the synopsis information and the video time information received from the terminal device; and
    a second content production unit for producing Four-Dimensional (4D) content using the special effect selection information received from the terminal device,
    wherein the terminal device transmits playback information including a play date, time and place,
    wherein the playback information is free from synchronization with the content, and
    wherein the special effect codes are used to create special effects in synchronization with each play interval of the content.

5. The content production apparatus according to claim 4, wherein the special effect codes are used to create special effects in synchronization with each play interval of the content.

6. The content production apparatus according to claim 4, wherein the 4D content includes special effect codes.

7. A method for providing a Four-Dimensional (4D) content production service of a content production apparatus, comprising:
    receiving content source including at least one of a picture, text and video, synopsis information and video time information from a terminal device;
    generating content using the content source on the basis of the received synopsis information and video time information;
    transmitting the generated content and special effect codes to the terminal device;
    receiving, from the terminal device, special effect selection information indicating a selected special effect code corresponding to each play interval of the content; and
    producing 4D content using the received special effect selection information,
    wherein the terminal device transmits playback information including a play date, time and place,
    wherein the playback information is free from synchronization with the content, and wherein the special effect codes are used to create special effects in synchronization with each play interval of the content.

8. The method according to claim 7, wherein the generating of the content comprises determining a sequence of the content source using the synopsis information and determining duration of the content on the basis of the video time information.

9. The method according to claim 7, further comprising transmitting the produced 4D content including special effect codes to a content playback apparatus,
   wherein the content playback apparatus receives the playback information from the terminal device and plays the 4D content on the basis of the received play information.

* * * * *